Patented Mar. 11, 1947

2,417,306

UNITED STATES PATENT OFFICE 2,417,306

METALLIZABLE POLYAZO DYES FROM BENZIDINE INTERMEDIATES

Adolf Krebser, Riehen, near Basel, and Werner Bossard and Peter Hindermann, Basel, Switzerland, assignors to J. R. Geigy A. G., Basel, Switzerland, a Swiss firm No Drawing. Application December 20, 1943, Serial No. 515,022. In Switzerland December 22, 1942

12 Claims. (Cl. 260—166)

It has been found that valuable copperable polyazo dyestuffs are obtained by combining tetrazotised 4:4'-diamino-3:3'-dialkoxydiphenyl compounds, the alkoxy groups of which may also be substituted, in any suitable order of succession with 1-molecule of an aminoazo dyestuff, which is obtainable by acid coupling of an o-carboxydiazonium compound of the benzene series, which may further be substituted in any way, with 2-amino-5-hydroxynaphthalene-7-sulfonic acid and with 1 molecule of any coupling component containing at least one hydroxy group and being suitable for the manufacture of metallisable azo dyestuffs, which latter coupling component may be identical with the first one.

The first coupling of the said tetrazonium compounds with one molecule of the defined aminoazo dyestuff in order to form the so-called intermediate product, the disazoazo compound, is readily carried out, while the further coupling with a second molecule of one of the said coupling components is much more difficult. The order of succession of the coupling may be chosen according to the coupling energy of the components. Components coupling difficultly are coupled with the diazo-azo-intermediate product in presence of pyridine. Besides the aminoazo dyestuffs already mentioned, which may be mono- and disazo dyestuffs, there may be used as coupling components for instance salicylic acid, m-cresotinic acid or 1-naphthol-2-carboxylic acid; moreover, for instance, the following naphthol compounds may also be used: β-naphthol, 1-hydroxynaphthalene-4-sulfonic acid, 2-hydroxynaphthalene-6-sulfonic acid, 2:8-dihydroxynaphthalene-6-sulfonic acid, 1-amino-8-hydroxynaphthalene-4-sulfonic acid, 1-amino-5-hydroxynaphthalene-7-sulfonic acid, 2-amino-8-hydroxynaphthalene-6-sulfonic acid, 1-acetylamino-8-hydroxynaphthalene-2-sulfonic acid, 1-acetyl-amino-8-hydroxynaphthalene-4-sulfonic acid, 1-phenylamino-8-hydroxynaphthalene-4-sulfonic acid, 1-benzoylamino - 8 - hydroxynaphthalene - 4-sulfonic acid, 2-(4'- hydroxy - 3'- carboxyphenylamino) - 5-hydroxy-naphthalene-7-sulfonic acid, 1-amino-8-hydroxynaphthalene-3:6-disulfonic acid, 1-amino-8-hydroxynaphthalene - 2:4 - disulfonic acid and the like. For acid coupling with 2-amino-5-hydroxynaphthalene-7-sulfonic acid, there are suitable for instance the diazonium compounds of 2-aminobenzoic acid, 5-nitro-2-aminobenzoic acid, 4-methyl-2-amino-benzoic acid, 3- or 5-chloro-2-aminobenzoic acid, 3:5-dichloro-2-aminobenzoic acid, 5-acetylamino-2-amino-benzoic acid, 5-cyano-2-aminobenzoic acid, 2-(4'-amino-3'-carboxybenzenesulf)-aminobenzoic acid, 4'-hydroxy - 4 - aminoazobenzene -3:3'-dicarboxylic acid and the like.

The new dyestuffs yield on cotton and regenerated cellulosic fibres navy-blue or violet-brown to black dyeings which, by after-treatment with copper salts according to known methods, become excellently fast to water and to washing without changing the shades in a noticeable manner.

The present invention will now be illustrated by way of the following examples, wherein the parts are by weight. Of course, the invention is not to be limited to the following examples.

Example 1

24.4 parts of 4:4'-diamino-3:3'-dimethoxydiphenyl are tetrazotised, whereupon the solution of the tetrazonium salt is added at 0°–2° C. to a solution of 86.4 parts of the monoazo dyestuff obtainable according to known methods in an acid solution from diazotised 5-nitro-2-aminobenzoic acid and 2-amino-5-hydroxynaphthalene-7-sulfonic acid in 600 parts of water and in the presence of 314 parts of pyridine and 15 parts of ammonia. After having completed the coupling by stirring for several hours at room temperature the dyestuff is precipitated at 40° C. by means of sodium chloride, then filtered off and dried.

The new tetrakisazo dyestuff being a dark bronzy powder dissolves in water with a blue coloration and in concentrated sulfuric acid with a dirty violet-blue coloration and dyes cellulosic fibres in navy-blue shades. By a subsequent coppering the dyeing becomes somewhat deepened; it possesses valuable fastness properties in the moist state.

If in this example 5-nitro-2-aminobenzoic acid is replaced by 2-amino-benzoic acid, 4-methyl-2-aminobenzoic acid, 3-chloro-2-aminobenzoic acid, 3:6-dichloro-2-amino-benzoic acid, 5-acetyl-amino-2-aminobenzoic acid, 5-cyano-2-aminobenzoic acid, 2-(4'-amino -3'- carboxybenzenesulf)aminobenzoic acid, dyestuffs with similar properties are obtained.

Example 2

24.4 parts of 4:4'-diamino-3:3'-dimethoxydiphenyl are tetrazotised, whereupon the tetrazo compound thus obtained is added to a solution of 84.3 parts of the monoazo dyestuff obtainable by coupling diazotised 4-chloro-2-aminobenzoic acid and 2-amino -5- hydroxynaphthalene-7-sulfonic acid in 600 parts of water, 314 parts of pyridine and 15 parts of ammonia. After a stirring for several hours at room temperature the coupling is complete, whereupon the dyestuff thus obtained is salted out at 40° C. by means of sodium chloride, then filtered off and dried.

The new dyestuff constitutes a dark bronzy powder. It is soluble in water with a blue coloration and in concentrated sulfuric acid with a dirty violet-blue coloration and dyes cellulosic fibres in navy-blue shades becoming somewhat darker, when subsequently coppered, and possessing very good fastness properties to light and in the moist state.

The properties of the dyestuff remain the same, if instead of 4:4'-diamino-3:3'-dimethoxydiphenyl there is used for example 4:4'-diamino-3:3'-dicarboxymethoxydiphenyl or 4:4'-diamino-3:3'-diethoxydiphenyl.

Example 3

A solution of the tetrazo compound from 24.4 parts of 4:4'-diamino-3:3'-dimethoxydiphenyl is combined at room temperature in the presence of an excess of sodium carbonate with a solution of 38.7 parts of the monoazo dyestuff obtainable from diazotised 2-aminobenzoic acid and 2-amino-5-hydroxynaphthalene-7-sulfonic acid, the coupling taking place rapidly. After completion of the dyestuff formation the solution cooled down to 0°–5° C. is coupled at this temperature with a solution of 43.2 parts of the monoazo dyestuff obtainable from diazotised 5-nitro-2-aminobenzoic acid and 2-amino-5-hydroxynaphthalene-7-sulfonic acid in 300 parts of water, 250 parts of pyridine and 8 parts of ammonia. After a stirring for several hours at room temperature also the second coupling is complete. After being warmed up to 40° C. the dyestuff is salted out by means of sodium chloride, filtered off and dried.

The new dyestuff is a dark bronzy powder which dissolves in water with a blue coloration and in concentrated sulfuric acid with a dirty violet-blue coloration. It dyes cellulosic fibres in navy-blue shades becoming somewhat darker, when subsequently coppered, and having improved fastness properties to light and in the moist state.

Of course, by working in the manner described in this example, any other combinations may be prepared, if either the 2-aminobenzoic acid is replaced by any other compound mentioned at the end of Example 1 or if another dialkoxydiaminodiphenyl compound is used.

Example 4

24.4 parts of 4:4'-diamino-3:3'-dimethoxydiphenyl are tetrazotised in the usual manner and combined with 15.3 parts of salicylic acid and 30 parts of sodium carbonate. As soon as the formation of the intermediate product is completed, coupling is effected in the presence of 150 parts of pyridine and 15 parts of sodium carbonate with the monoazo dyestuff which is obtainable by acid coupling of 13.7 parts of diazotised 2-aminobenzoic acid with 23.9 parts of 2-amino-5-hydroxynaphthalene-7-sulfonic acid according to known methods.

The trisazo dyestuff thus finished is precipitated by means of sodium chloride, then filtered off and dried. It constitutes a dark powder dissolving in water with a red-violet coloration and in concentrated sulfuric acid with a blue coloration. It dyes cellulosic fibres, after having subsequently been treated with copper sulfate, in violet-brown shades of very good fastness properties in the moist state.

When, in this example, the 2-aminobenzoic acid is replaced by 4-methyl-2-aminobenzoic acid, 4-chloro-2-aminobenzoic acid or 5-acetylamino-2-aminobenzoic acid, dyestuffs with similar properties are obtained.

Example 5

24.4 parts of 4:4'-diamino-3:3'-dimethoxydiphenyl are tetrazotised and coupled on one half side in a soda-alkaline solution with 17 parts of m-cresotinic acid. The diazoazo compound is allowed to flow into a solution of 43.2 parts of the monoazo dyestuff obtainable by acid coupling of diazotised 5-nitro-2-aminobenzoic acid with 2-amino-5-hydroxynaphthalene-7-sulfonic acid in 300 parts of water, 150 parts of pyridine and 20 parts of sodium carbonate. After the complete coupling the trisazo dyestuff is salted out, filtered off and dried.

The new dyestuff is a dark powder. Its solution in water is violet, that in concentrated sulfuric acid reddish-blue. It dyes cellulosic fibres, when subsequently coppered, in black shades. These dyeings are distinguished by excellent fastness properties to washing and to light.

Similar dyestuffs are obtained by using o-cresotinic acid or β-resorcylic acid instead of m-cresotinic acid. When using salicylic acid, a dyestuff is obtained which constitutes a dark powder dissolving in water with a violet coloration and dyeing cellulosic fibres in black shades, as far as the fibres have subsequently been coppered.

Example 6

24.4 parts of 4:4'-diamino-3:3'-dimethoxydiphenyl are tetrazotised in a hydrochloric acid solution with 13.8 parts of sodium nitrite and combined, in the presence of an excess of sodium carbonate, with a solution of 43.2 parts of the monoazo dyestuff which has been prepared by coupling in an acid medium diazotised 5-nitro-2-aminobenzoic acid with 2-amino-5-hydroxynaphthalene-7-sulfonic acid. When the intermediate compound has been formed, it is treated with an aqueous solution of 18.8 parts of 1-hydroxy-2-naphthalene carboxylic acid, 20 parts of sodium carbonate and 150 parts of pyridine. After several hours the second coupling is also complete. The dyestuff is precipitated by means of sodium chloride, then filtered off and dried.

The new dyestuff is a dark powder which dissolves in water with a violet coloration and in concentrated sulfuric acid with a blue coloration. The after-coppered dyeings on cellulosic fibres are black and possess good fastness properties to washing and to water.

A dyestuff with similar properties is obtained, when using 4:4'-diamino-3:3'-dicarboxy-methoxydiphenyl instead of 4:4'-diamino-3:3'-dimethoxydiphenyl.

Example 7

The diazoazo compound made according to Example 4 from 24.4 parts of 4:4'-diamino-3:3'-dimethoxy diphenyl and 15.3 parts of salicylic acid is combined in the presence of 150 parts of pyridine and 15 parts of sodium carbonate with 65.1 parts of the dyestuff which has been obtained by acid coupling diazotised 4'-hydroxy-4-aminoazo-benzene-3:3'-dicarboxylic acid with 2-amino-5-hydroxynaphthalene-7-sulfonic acid. The tetrakisazo dyestuff thus formed is completely precipitated by means of sodium chloride, then filtered off and dried.

The new dyestuff is a dark powder which dyes cellulosic fibres, when subsequently coppered, in bluish-black shades of good fastness properties. It is soluble in water with a violet coloration and in concentrated sulfuric acid with a bluish-black coloration.

Example 8

24.4 parts of 4:4'-diamino-3:3'-dimethoxydiphenyl are tetrazotised in a hydrochloric acid solution with 13.8 parts of sodium nitrite and combined, in the presence of excess sodium carbonate, with a solution of 42.1 parts of the monoazo dyestuff obtainable by coupling in an acid medium diazotised 4-chloro-2-aminobenzoic acid with 2-amino-5-hydroxynaphthalene-7-sulfonic acid. After the formation of the intermediate compound the same is treated with an aqueous solution of 22.4 parts of 1-hydroxynaphthalene-4-sulfonic acid and 20 parts of sodium carbonate. After some hours the second coupling is complete. The dyestuff is then precipitated by means of sodium chloride, filtered and dried.

The new dyestuff is a dark bronzy powder dissolving in water with a blue coloration and in concentrated sulfuric acid with a greenish-blue coloration and dyeing cellulosic fibres in reddish-navy-blue shades. By after-coppering dyeings of very valuable fastness properties in the moist state are obtained.

Example 9

24.4 parts of 4:4'-diamino-3:3'-dimethoxydiphenyl are tetrazotised and coupled on one half side in a soda-alkaline solution with 43.2 parts of the monoazo dyestuff obtainable by acid coupling of diazotised 5-nitro-2-aminobenzoic acid with 2-amino-5-hydroxynaphthalene-7-sulfonic acid. Then an aqueous solution of 22.4 parts of 2-hydroxynaphthalene-6-sulfonic acid, 20 parts of sodium carbonate and 150 parts of pyridine is caused to flow into the obtained intermediate product. The coupling having been completed by a stirring for several hours at room temperature, the dyestuff is precipitated at 40° C. by means of sodium chloride, then filtered off and dried.

The new dyestuff, a dark bronzy powder, dissolves in water and in concentrated sulfuric acid giving a blue coloration and dyes cellulosic fibres in reddish-navy-blue shades. When subsequently coppered, the dyeings possess good fastness properties in the moist state.

If, in this example, the monoazo dyestuff from 5-nitro-2-aminobenzoic acid and 2-amino-5-hydroxynaphthalene-7-sulfonic acid is replaced by the disazo dyestuff obtainable from diazotised 4'-hydroxy-4-aminoazobenzene-3:3'-dicarboxylic acid and 2-amino-5-hydroxynaphthalene-7-sulfonic acid, a dyestuff of similar properties is obtained.

Example 10

24.4 parts of 4:4'-diamino-3:3'-dimethoxydiphenyl are tetrazotised and combined, in the presence of excess sodium carbonate, with a solution of 38.7 parts of the monoazo dyestuff obtainable by coupling in an acid medium 2-aminobenzoic acid with 2-amino-5-hydroxynaphthalene-7-sulfonic acid. As soon as the intermediate compound is formed, an aqueous solution of 31.9 parts of 1-amino-8-hydroxynaphthalene-2:4-disulfonic acid, 20 parts of sodium carbonate and 150 parts of pyridine is allowed to flow into the intermediate product. After some hours the second coupling has finished. The dyestuff is now precipitated by means of sodium chloride, filtered off and dried.

The new dyestuff constitutes a dark bronzy powder which is soluble in water with a blue coloration and in concentrated sulfuric acid with a green coloration and which dyes cellulosic fibres in greenish-navy-blue shades. When after-coppered, the dyeings show very valuable fastness properties in the moist state.

Example 11

24.4 parts of 4:4'-diamino-3:3'-dimethoxydiphenyl are tetrazotised and coupled in a soda-alkaline solution with 37.5 parts of 2-(4'-hydroxy-3'-carboxyphenylamino)-5-hydroxynaphthalene-7-sulfonic acid. Then an aqueous solution of 43.2 parts of the monoazo dyestuff obtainable by coupling diazotised 5-nitro-2-aminobenzoic acid with 2-amino-5-hydroxynaphthalene-7-sulfonic acid in the presence of 20 parts of sodium carbonate and 150 parts of pyridine is caused to flow into the intermediate product. After a stirring for several hours at room temperature the finished trisazo dyestuff is precipitated by means of sodium chloride, filtered and dried.

The new dyestuff is a dark powder which is soluble in water with a violetish-blue coloration and in concentrated sulfuric acid with a blue coloration; it dyes cellulosic fibres, when subsequently coppered, in reddish-navy-blue shades of good fastness properties in the moist state.

Further combinations according to this invention are enumerated in the following table:

Table

| Tetrazo compound | Acid coupling product from 2-amino-5-hydroxynaphthalene-7-sulfonic acid and diazotised | Naphtholsulfonic acid compound | Shade of the subsequently coppered dyeing |
|---|---|---|---|
| 4:4'-diamino-3:3'-dimethoxydiphenyl | 5-nitro-2-amino-benzoic acid | 1-amino-8-hydroxynaphthalene-2:4-disulfonic acid. | Navy-blue. |
| Do | 4-methyl-2-aminobenzoic acid | 2-hydroxynaphthalene-6-sulfonic acid | Do. |
| Do | 2-aminobenzoic acid | 1-amino-8-hydroxynaphthalene-4-sulfonic acid. | Do. |
| Do | 5-chloro-2-aminobenzoic acid | 1-phenylamino-8-hydroxynaphthalene-4-sulfonic acid | Do. |
| Do | 5-nitro-2-aminobenzoic acid | 1-amino-8-hydroxynaphthalene-3:6-disulfonic acid. | Greenish-navy-blue. |
| Do | 4'-hydroxy-4-aminoazobenzene-3:3'-dicarboxylic acid. | 1-hydroxynaphthalene-4-sulfonic acid | Navy-blue. |
| Do | 5-nitro-2-aminobenzoic acid | 1-amino-5-hydroxynaphthalene-7-sulfonic acid. | Greenish-navy-blue. |
| 4:4'-diamino-3:3'-dicarboxymethoxydiphenyl. | do | 2-amino-8-hydroxynaphthalene-6-sulfonic acid. | Navy-blue. |
| 4:4'-diamino-3:3'-dimethoxydiphenyl | do | 1-acetylamino-8-hydroxynaphthalene-2-sulfonic acid. | Reddish-navy-blue. |
| Do | 2-aminobenzoic acid | 1-benzoylamino-8-hydroxynaphthalene-4-sulfonic acid. | Greenish-navy blue. |
| Do | 5-chloro-2-aminobenzoic acid | 1-amino-8-hydroxynaphthalene-3:6-disulfonic acid. | Navy-blue. |
| Do | 5-nitro-2-aminobenzoic acid | 1-amino-8-hydroxynaphthalene-4-sulfonic acid. | Greenish-navy-blue. |
| Do | do | 1-acetylamino-8-hydroxynaphthalene-4-sulfonic acid. | Reddish-navy-blue. |
| Do | do | 1-phenylamino-8-hydroxynaphthalene-4-sulfonic acid. | Do. |
| Do | do | 1-benzoylamino-8-hydroxynaphthalene-4-sulfonic acid. | Reddish-navy-blue. |
| Do | 5-sulfo-2-aminobenzoic acid | 2-hydroxynaphthalene | Do. |

What we claim is:
1. Process for the manufacture of polyazo dyestuffs capable of being coppered, of the general formula

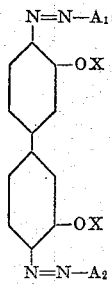

which comprises coupling a tetrazotised amine of the formula

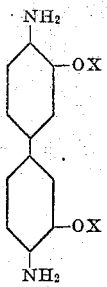

wherein X means a member of the group consisting of —$CH_3$, —$C_2H_5$ and —$CH_2COOH$, with one molecule of a coupling component H—$A_1$ and with one molecule of a coupling component H—$A_2$, H—$A_1$ being a monoazo dyestuff of the general formula

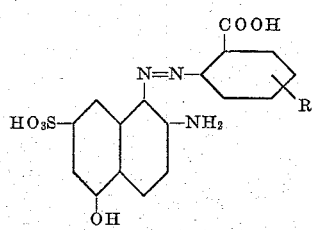

R meaning at least one member of the group consisting of H, Cl, $CH_3$, $NO_2$, CN, —$NH.COCH_3$ and —$SO_2NH.C_6H_4.COOH(1:2)$, and H—$A_2$ being a member of the group consisting of H—$A_1$, salicylic acid, m-cresotinic acid, 1-hydroxynaphthalene-2-carboxylic acid, β-naphthol and hydroxynaphthalene sulfonic acid compounds capable of being coupled in o-position to the hydroxy group.

2. Process for the manufacture of polyazo dyestuffs capable of being coppered, of the general formula

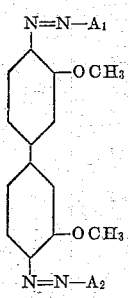

which comprises coupling tetrazotised 4:4'-diamino-3:3'-dimethoxydiphenyl with one molecule of a coupling component H—$A_1$ and with one molecule of a coupling component H—$A_2$, H—$A_1$ being a monoazo dyestuff of the general formula

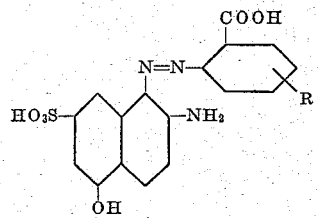

R meaning at least one member of the group consisting of H, Cl, $CH_3$, $NO_2$, CN, —$NH.COCH_3$ and —$SO_2NH.C_6H_4.COOH(1:2)$, and H—$A_2$ being a member of the group consisting of H—$A_1$, salicylic acid, m-cresotinic acid, 1-hydroxynaphthalene-2-carboxylic acid β-naphthol and hydroxynaphthalene sulfonic acid compounds capable of being coupled in o-position to the hydroxy group.

3. Process for the manufacture of polyazo dyestuffs capable of being coppered, of the general formula

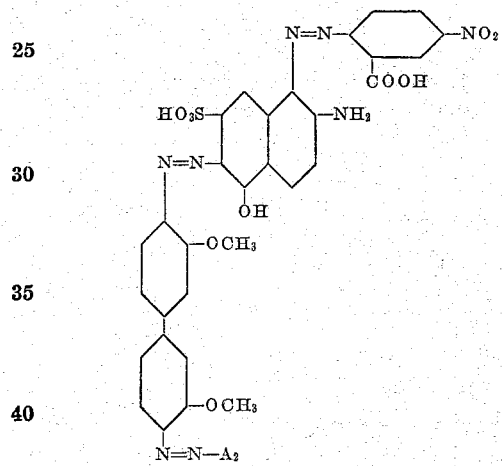

which comprises coupling tetrazotised 4:4'-diamino-3:3'-dimethoxydiphenyl with one molecule of the monoazo dyestuff obtained by coupling diazotised 5-nitroanthranilic acid with 2-amino-5-hydroxynaphthalene-7-sulfonic acid and with one molecule of the coupling compound H—$A_2$, H—$A_2$ being a member of the group consisting of the monoazo dyestuff of the general formula

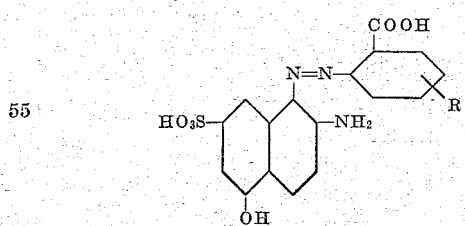

salicylic acid, m-cresotinic acid, 1-hydroxynaphthalene-2-carboxylic acid, β-naphthol and hydroxynaphthalene sulfonic acid compounds capable of being coupled in o-position to the hydroxy group, R meaning at least one member of the group consisting of H, Cl, $CH_3$, $NO_2$, CN, —$NHCOCH_3$, and —$SO_2NH.C_6H_4.COOH(1:2)$.

4. Process for the manufacture of a polyazo dyestuff, capable of being coppered, which comprises coupling tetrazotised 4:4'-diamino-3:3'-dimethoxydiphenyl with two molecules of the monoazo dyestuff obtained by acid coupling diazotised 5-nitroanthranilic acid with 2-amino-5-hydroxynaphthalene-7-sulfonic acid.

5. Process for the manufacture of a polyazo dyestuff, capable of being coppered, which comprises coupling tetrazotised 4:4'-diamino-3:3'-dimethoxydiphenyl with one molecule of the monoazo dyestuff obtained by acid coupling diazotised 5-nitroanthranilic acid with 2-amino-5-hydroxynaphthalene-7-sulfonic acid and one molecule of salicylic acid.

6. Process for the manufacture of a polyazo dyestuff, capable of being coppered, which comprises coupling tetrazotised 4:4'-diamino-3:3'-dimethoxydiphenyl with one molecule of the monoazo dyestuff obtained by acid coupling diazotised 5-nitroanthranilic acid with 2-amino-5-hydroxynaphthalene-7-sulfonic acid and one molecule of 2-hydroxynaphthalene-6-sulfonic acid.

7. The polyazo dyesuffs, capable of being coppered, corresponding in the free state to the general formula

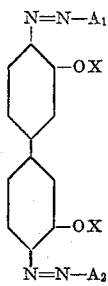

wherein X means a member of the group consisting of —$CH_3$, —$C_2H_5$ and —$CH_2.COOH$, $A_1$ means a radical of coupled compounds of the formula

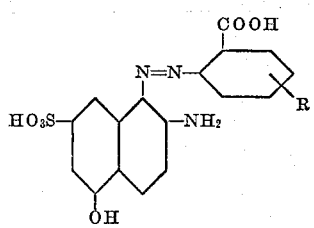

R meaning at least one member of the group consisting of H, Cl, $CH_3$, $NO_2$, CN, —$NH.COCH_3$ and —$SO_2NH.C_6H_4.COOH(1:2)$, and $A_2$ means a radical of compounds of the group consisting of H—$A_1$, salicylic acid, m-cresotinic acid, 1-hydroxynaphthalene-2-carboxylic acid, β-naphthol and hydroxynaphthalene sulfonic acid compounds capable of being coupled in o-position to the hydroxy group, being dark powders, dissolving in water with a blue to violet coloration and dyeing cellulosic fibres, when after-coppered, in blue to black shades of excellent fastness properties.

8. The polyazo dyestuffs, capable of being coppered, corresponding in the free state to the general formula

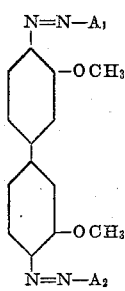

wherein $A_1$ means a radical of coupled compounds of the formula

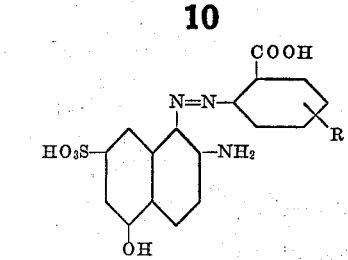

R meaning at least one member of a group consisting of H, Cl, $CH_3$, $NO_2$, CN, —$NH.COCH_3$ and —$SO_2.NH.C_6H_4.COOH(O—)$, and $A_2$ means a radical of compounds of the group consisting of H—$A_1$, salicylic acid, m-cresotinic acid, 1-hydroxynaphthalene-2-carboxylic acid, β-naphthol and hydroxynaphthalene sulfonic acid compounds capable of being coupled in o-position to the hydroxy group, being dark powders, dissolving in water with a blue to violet coloration and dyeing cellulosic fibres, when after-coppered, in blue to black shades of excellent fastness properties.

9. The polyazo dyestuffs, capable of being coppered, corresponding in the free state to the general formula

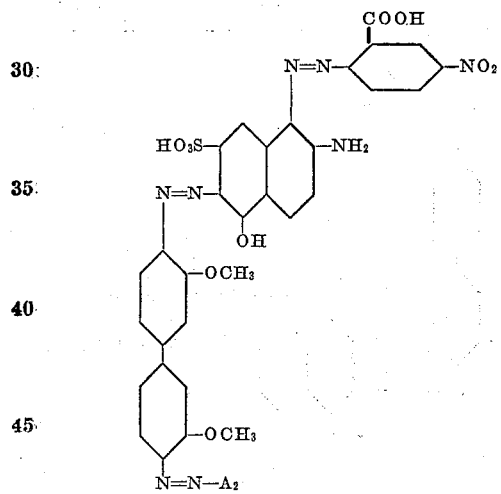

wherein $A_2$ means a radical of compounds of the group consisting of the monoazo dyestuff of the general formula

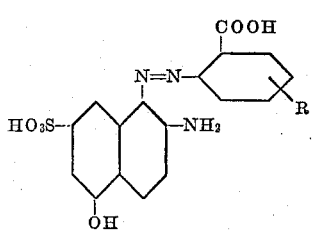

salicylic acid, m-cresotinic acid, 1-hydroxynaphthalene-2-carboxylic acid, β-naphthol and hydroxynaphthalene sulfonic acid compounds capable of being coupled in o-position to the hydroxy group, R meaning at least one member of the groups consisting of H, Cl, $CH_3$, $NO_2$, CN, —$NHCOCH_3$ and —$SO_2NH.C_6H_4.COOH(1:2)$, being dark powders, dissolving in water with a blue to violet coloration and dyeing cellulosic fibres, when after-coppered, in blue to black shades of excellent fastness properties.

10. The polyazo dyestuff, capable of being coppered, corresponding in the free state to the formula

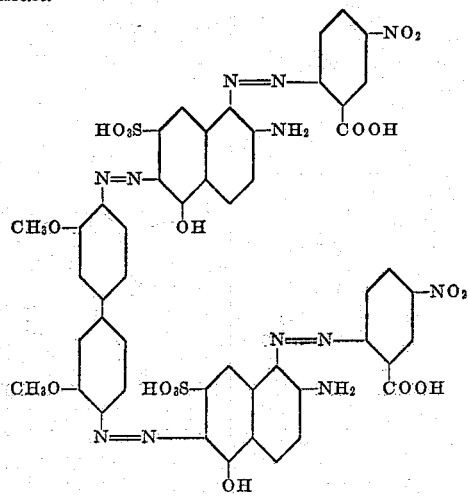

being a dark powder, dissolving in water with a blue coloration and dyeing cellulosic fibres, when after-coppered, in blue shades of excellent fastness properties.

11. The polyazo dyestuff, capable of being coppered, corresponding in the free state to the formula

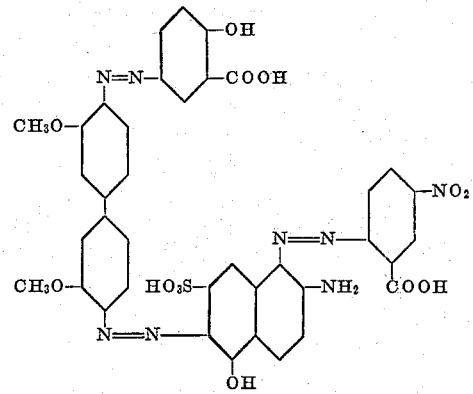

being a dark powder, dissolving in water with a violet coloration and dyeing cellulosic fibres, when after-coppered, in black shades of excellent fastness properties.

12. The polyazo dyestuff, capable of being coppered, corresponding in the free state to the formula

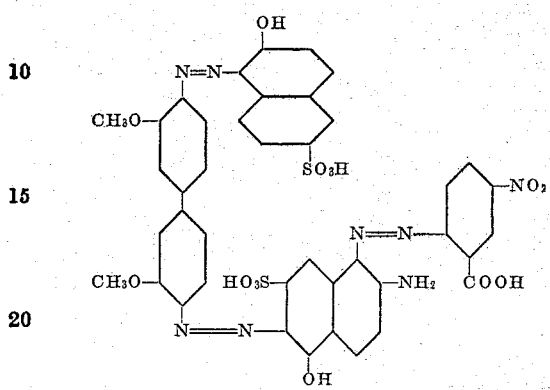

being a dark powder, dissolving in water with a blue coloration and dyeing cellulosic fibres, when after-coppered, in blue shades of excellent fastness properties.

ADOLF KREBSER.
WERNER BOSSARD.
PETER HINDERMANN.

REFERENCES CITED

The following references are of record in the file of this patent:

UNITED STATES PATENTS

| Number | Name | Date |
|---|---|---|
| 1,282,355 | Anderwert et al. | Oct. 22, 1918 |
| 1,901,387 | Wiedemann et al. | Mar. 14, 1933 |
| 2,277,262 | Stein et al. | Mar. 24, 1942 |